(12) United States Patent
Hochmayr et al.

(10) Patent No.: US 7,464,685 B2
(45) Date of Patent: Dec. 16, 2008

(54) CRANKSHAFT BEARING ASSEMBLY

(75) Inventors: Markus Hochmayr, Krenglbach (AT); Karl Glinsner, Wels (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 11/559,712

(22) Filed: Nov. 14, 2006

(65) Prior Publication Data

US 2007/0131192 A1 Jun. 14, 2007

Related U.S. Application Data

(60) Provisional application No. 60/736,854, filed on Nov. 16, 2005.

(30) Foreign Application Priority Data

Nov. 14, 2005 (EP) ................................. 05110703

(51) Int. Cl.
*F02F 7/00* (2006.01)
*F16C 35/08* (2006.01)

(52) U.S. Cl. .................... 123/195 R; 384/432

(58) Field of Classification Search ............ 123/195 R, 123/198 DA, 195 A, 195 H; 384/429, 432, 384/433, 434; 29/888, 888.01; 92/146, 147
See application file for complete search history.

(56) References Cited

U.S. PATENT DOCUMENTS

| 2,025,297 | A | | 12/1935 | Meyer |
| 3,089,735 | A | | 5/1963 | Mann |
| 4,651,691 | A | | 3/1987 | Ogawa |
| 5,203,854 | A | * | 4/1993 | Nilsson et al. ............... 384/433 |
| 5,501,529 | A | * | 3/1996 | Cadle et al. .................. 384/432 |
| 5,727,512 | A | * | 3/1998 | Hutchins .................. 123/193.3 |
| 6,070,562 | A | * | 6/2000 | Van Bezeij .............. 123/195 R |
| 6,231,240 | B1 | * | 5/2001 | Brenker et al. ............... 384/432 |
| 6,655,843 | B2 | * | 12/2003 | Suzuki ........................ 384/433 |
| 6,715,458 | B1 | * | 4/2004 | Tappen .................... 123/195 R |
| 6,942,391 | B2 | * | 9/2005 | Nakamura ................... 384/432 |
| 7,273,030 | B2 | * | 9/2007 | Yoshihara et al. ........ 123/195 R |
| 2002/0100450 | A1 | * | 8/2002 | Harima .................... 123/195 R |
| 2004/0000229 | A1 | * | 1/2004 | Nakamura ..................... 92/140 |
| 2007/0209628 | A1 | * | 9/2007 | Natkin et al. ............ 123/195 R |

FOREIGN PATENT DOCUMENTS

JP 2000337348 A 12/2000

OTHER PUBLICATIONS

European Search Report of EP06124087; Munich, Feb. 13, 2007; Fischbach, Gerhard.
Japanese Abstract of 2000337348.

* cited by examiner

*Primary Examiner*—Stephen K Cronin
*Assistant Examiner*—Ka Chun Leung
(74) *Attorney, Agent, or Firm*—Osler, Hoskin & Harcourt LLP (57) ABSTRACT

A Crankshaft bearing assembly for supporting a crankshaft for rotation about a crankshaft axis within an engine having an aluminum engine block, the crankshaft bearing assembly including at least one crankshaft bearing divided into a first half and a second half, the first half being integral with the engine block, and the second half being a bearing cap connectable to the engine block. The bearing cap is made of an aluminum alloy having a tensile strength higher than the tensile strength of the engine block.

15 Claims, 5 Drawing Sheets

CRANKSHAFT BEARING ASSEMBLY

CROSS REFERENCES TO RELATED APPLICATIONS

The present Utility Patent Application claims priority from U.S. Provisional Patent Application No. 60/736,854 filed Nov. 16, 2005, the content of which is incorporated herein by reference. The present Utility Patent Application is also related to European Patent Application No. 05110703.5, filed Nov. 14, 2005.

FIELD OF THE INVENTION

The present invention relates generally to crankshaft bearings for internal combustion engines and in particular to crankshaft friction bearings for internal combustion engines.

BACKGROUND OF THE INVENTION

For light vehicles, engine blocks and their main bearing caps are increasingly made from cast aluminum for their weight-saving potential. However cast aluminum engine blocks and main bearing caps are typically bulkier than their cast iron counterparts to compensate for the substantially inferior tensile strengths typically displayed by cast aluminum parts thereby negating some of the weight saving advantage previously mentioned. To alleviate this problem, engine manufacturers have combined cast aluminum engine blocks with cast iron main bearing caps. However, the use of cast iron main bearing caps with aluminum engine cylinder blocks or crankcases requires more complex and difficult machining and increases the weight of the engine.

Thus, there is a need for a crankshaft bearing assembly that alleviates some of the drawbacks of conventional crankshaft bearing assembly and preferably improves the durability of the engine in which the crankshaft bearing assembly is used.

STATEMENT OF THE INVENTION

One aspect of the present invention is to provide a crankshaft bearing assembly for a cast aluminum engine in which at least one bearing cap is made of an aluminum having a tensile strength higher than the tensile strength of the aluminum of the engine or crankcase.

Another aspect of the present invention is to provide a crankshaft bearing assembly for supporting a crankshaft for rotation about a crankshaft axis within an engine having a crankcase, the crankshaft bearing assembly including at least one crankshaft bearing divided into a first half and a second half, the first half being integral with the crankcase, and the second half being a bearing cap connectable to the crankcase; the crankcase being made of a first aluminum alloy having a first tensile strength and the bearing cap being made of a second aluminum alloy having a second tensile strength higher than the first tensile strength, the second tensile strength of the second aluminum alloy being at least 300 MPa.

In another aspect, the first aluminum alloy is a cast alloy and the second aluminum alloy is a wrought alloy. In an additional aspect, the first half of the bearing is made by casting and the second half of the bearing is made by forging.

In a further aspect, the first aluminum alloy possesses a tensile strength of at most 250 MPa and the second aluminum alloy possesses a tensile strength of a least 350 MPa.

In an additional aspect, the crankshaft bearing includes a bearing bore, the bearing bore being split by the division of the crankshaft bearing and bearing bushings are disposed within the bearing bore.

In a further aspect, the crankshaft bearing includes a first crankshaft bearing having a first bearing cap and a second crankshaft bearing having a second bearing cap, the first and the second bearing cap being made in one piece.

In a further aspect of the present invention, the crankcase includes lateral extensions disposed on each sides of the bearing cap, the bearing cap being bolted to the lateral extensions of the crankcase.

In an additional aspect of the invention, the crankshaft bearing assembly further comprises a crankcase lower half, at least one of an end bearing cap being integral with the crankcase lower half.

Another aspect of the present invention is to provide an internal combustion engine comprising a crankshaft bearing assembly in which at least one bearing cap is made of an aluminum having a tensile strength higher than the tensile strength of the aluminum of the crankcase, the internal combustion engine having at least two cylinders and a power unit case having a crankcase and an integral transmission housing accommodating at least a transmission shaft.

In an additional aspect, the invention provides a motorcycle having an internal combustion chamber, the internal combustion engine having at least two cylinders, a crankshaft and a crankshaft bearing assembly for supporting the crankshaft within a power unit case having a crankcase and an integral transmission housing accommodating at least a transmission shaft; the crankshaft bearing assembly including at least one crankshaft bearing divided into a first half and a second half, the first half being integral with the crankcase, and the second half being a bearing cap connectable to the crankcase; the crankcase being made of a first aluminum alloy having a first tensile strength and the bearing cap being made of a second aluminum alloy having a second tensile strength higher than the first tensile strength, the second tensile strength of the second aluminum alloy being at least 300 MPa.

A further aspect of the invention of the present invention is to provide an All Terrain Vehicle (ATV) having an internal combustion chamber, the internal combustion engine having at least two cylinders, a crankshaft and a crankshaft bearing assembly for supporting the crankshaft within a power unit case having a crankcase and an integral transmission housing accommodating at least a transmission shaft; the crankshaft bearing assembly including at least one crankshaft bearing divided into a first half and a second half, the first half being integral with the crankcase, and the second half being a bearing cap connectable to the crankcase; the crankcase being made of a first aluminum alloy having a first tensile strength and the bearing cap being made of a second aluminum alloy having a second tensile strength higher than the first tensile strength, the second tensile strength of the second aluminum alloy being at least 300 MPa.

Embodiments of the present invention each have at least one of the above-mentioned aspects, but not necessarily have all of them.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DESCRIPTION OF PREFERRED EMBODIMENT(S)

Figure 1:
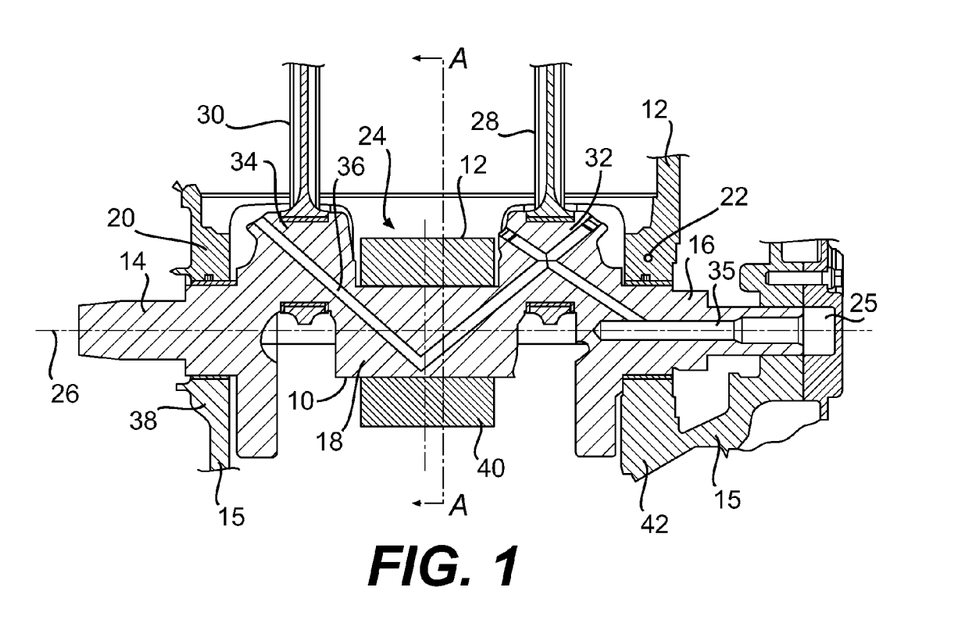
FIG. 1 is a longitudinal cross-sectional view of a crankshaft mounted into a crankcase of an internal combustion engine via a crankshaft bearing assembly in accordance with one embodiment of the invention.

With reference to FIG. 1, a crankshaft 10 is shown supported within the crankcase of an internal combustion engine, the lower portion of the crankcase being defined by a lower crankcase half 15 (shown partially). The crankshaft 10 is mounted onto the lower portion of the crankcase upper half 12 for rotational movement via three main bearing assemblies 20, 22 and 24 so as to rotate about a shaft axis 26. The crankcase upper half 12 in this particular embodiment is the bottom portion of the cylinder block itself. In other embodiment, the crankcase upper half may separate from the cylinders. The end journals 14, 16 of the crankshaft 10 are supported for rotation by the main bearing assemblies 20, 22 while the central main journal 18 is supported by the main bearing assembly 24. Two pistons (not shown) with corresponding connecting rods 28 and 30 are respectively connected to the rod journals 32 and 34 of the crankshaft 10 so as to be able to rotate thereon and impart rotational motion to the crankshaft 10. The upper halves of the main bearing assemblies 20, 22 and 24 are machined from the crankcase upper half 12 and are therefore integral with the latter. The lower halves 38, 40 and 42 of the main bearing assemblies 20, 22 and 24 consist of bearing caps bolted or otherwise secured to the crankcase upper half 12 in alignment with the upper halves of the main bearing assemblies 20, 22 and 24 thereby enveloping the crankshaft journals 14, 16 and 18 and securing the crankshaft 10 to the crankcase. The upper halves and the lower halves 38, 40 and 42 of the main bearing assemblies 20, 22 and 24 together defined crankshaft bearing bores.

Lubricating oil is routed to the main journals 14, 16 and 18 of the crankshaft 10 and therefore to the main bearing assemblies 20, 22 and 24 through an internal conduit 36 in the crankshaft 10 to provide adequate lubricant to the main bearing assemblies 20, 22 and 24. The lubricating oil enters from a pressurized oil chamber 25 into the main conduit 35 and is directed to the internal conduit 36 leading to the main bearing assemblies 20, 22 and 24.

The crankcase upper half 12 is made of a first cast aluminum having a tensile strength of about 200 MPa and at most 250 MPa whereas the bearing cap 40 is made of a wrought aluminum alloy having a tensile strength of at least 300 MPa and is able to sustain the heavy stresses applied to the main bearing assembly 24 located in the center of the engine. Cast aluminum alloys typically have high Si content, whereas wrought aluminum alloys typically have low Si content and higher tensile strength. In a specific embodiment, the bearing cap 40 is made of a wrought aluminum alloy having a tensile strength of at least 350 MPa. The bearing cap 40 can also be made from a cast aluminum alloy that has been forged giving is under tensile strength of at least 300 MPa and upward of 350 MPa.

In the embodiment illustrated in FIG. 1, the lower halves 38 and 42 of end bearing assemblies 20, 22 are machined from the lower crankcase half 15 and are therefore integral therewith. The crankcase lower half 15 is made of a cast aluminum similar to the crankcase upper half 12 having a tensile strength of about 200 MPa.

In another embodiment (not shown), the lower halves 38 and 42 of end bearing assemblies 20, 22 are bearing caps similar to the bearing cap 40 are made of wrought or forged aluminum alloy having a tensile strength of at least 300 MPa.

Figure 2:
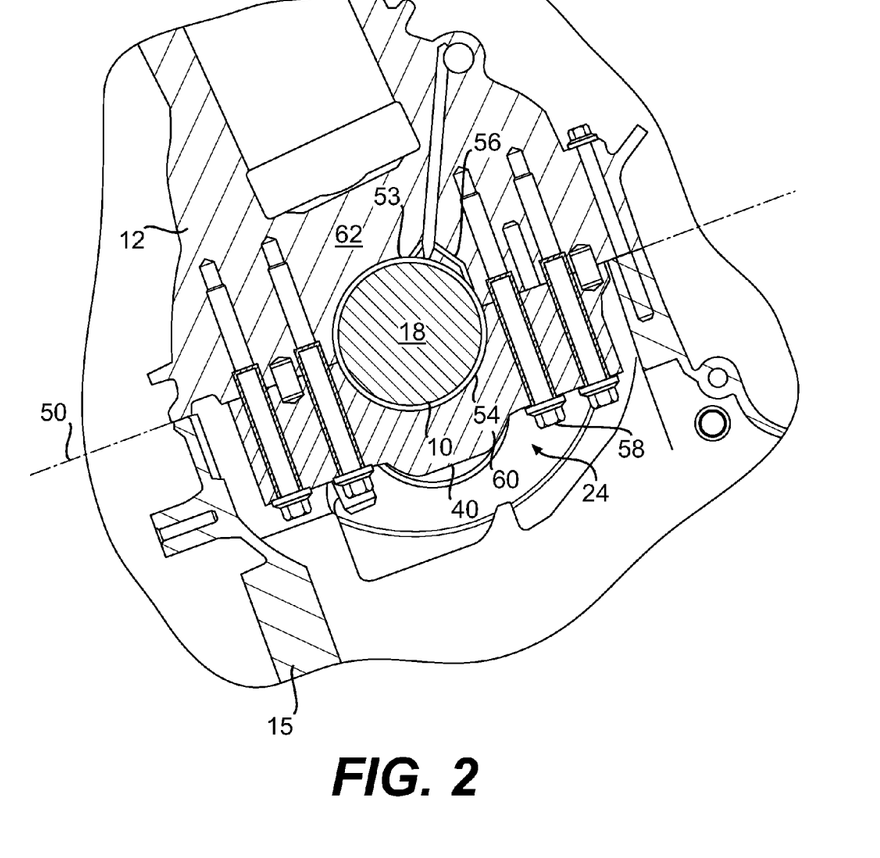
FIG. 2 is a cross-sectional view of a crankshaft bearing assembly taken at line A-A of FIG. 1.

With reference to FIG. 2. which is a cross section of the main bearing assembly 24, it can be seen that the crankcase is divided essentially horizontally on a separating plane 50, the upper portion being defined by the crankcase upper half 12 and the lower portion being defined by the crankcase lower half 15 The main bearing assembly 24 consists of an upper bearing surface 53 machined directly into the crankcase upper half 12 and a lower bearing surface 54 defined by the inner surface of the bearing cap 40. Between the upper and lower bearing surfaces 53 and 54 and the crankshaft journal 18, there is a small clearance gap 56 to allow ingress of lubricating oil and room to allow a thin oil film to form to improve running characteristics of the crankshaft 10 within the main bearing assembly 24. The lubricating oil is introduced into the bearing gap 56 through the internal conduit 36 of the crankshaft 10 as previously described.

Although not shown in FIG. 2, a pair of bearing bushings may be disposed on the upper and lower bearing surfaces 53 and 54 and fitted within the bearing bore of the bearing assembly 24 in between the bearing surfaces and the crankshaft journal 18 as is well known in the art of engine design.

As illustrated in FIG. 2, the lower half 60 of the main bearing assembly 24 is in the form of a bearing cap 40 secured onto the cylinder block 12 by means of at least one bolt 58. In the embodiment that is shown, a total of four bolts 58 are used to secure the bearing cap 40 to the cylinder block 12. In a specific embodiment not shown, the crankcase may have lateral extensions or web such that the bearing cap 40 is inserted in between the extensions and secured to the extensions by a set of transversal bolts.

In this particular embodiment, the upper half 62 of the main bearing assembly 24 is machined from the crankcase upper half 12 and is integral with the crankcase upper half 12. The upper half 62 is therefore made of the same cast aluminum as the crankcase upper half 12 and has a tensile strength of at least 200 MPa. In another embodiment, the crankcase upper half 12 is made of a higher grade cast aluminum having a tensile strength of at least 250 MPa. On the other hand, the bearing cap 40 which is the lower half 60 of the main bearing assembly 24 is made of a wrought aluminum alloy having a tensile strength of at least 300 MPa. Since the upper half 62 of the main bearing assembly 24 is machined directly into the crankcase upper half 12, it is much more voluminous than the bearing cap 40 and as such it is much stronger and does not require to be made of an aluminum having high tensile strength. The bearing cap 40 on the other hand is a small component that, if constructed from a similar cast aluminum as the crankcase upper half 12, would have to be oversized to withstand the large forces exerted on the main bearing assembly 24. If the bearing cap 40 were constructed from a similar cast aluminum as the crankcase upper half 12, the weight reduction potential of using aluminum would be offset by the oversize requirement. The use of a bearing cap 40 made of wrought aluminum alloy having a tensile strength of at least 300 MPa allows the bearing cap 40 to be smaller and therefore lighter and yet able to withstand the large forces exerted on the main bearing assembly 24. The use of a bearing cap 40 made of aluminum alloy that has been forged and having a tensile strength of at least 300 MPa allows the bearing cap 40 to be smaller and therefore lighter and yet able to withstand the large forces exerted on the main bearing assembly 24.

In another embodiment (not shown), the lower halves 38 and 42 of end bearing assemblies 20, 22 (FIG. 1) are bearing caps similar to the bearing cap 40 and are made of wrought or forged aluminum alloys having a tensile strength of at least 300 MPa. The upper halves of the end bearing assemblies 20, 22 being machined directly into the crankcase upper half 12 are more voluminous and do not require to be made of an aluminum having higher tensile strength. The bearing caps on the other hand are small components made of a higher tensile strength than the upper halves such that they can be made smaller and lighter yet able to withstand the large forces exerted on the main bearing assemblies 20 and 22.

In yet another embodiment, the engine includes four or five main bearing assemblies in accordance with the invention having bearing caps of higher tensile strength aluminum than the upper halves machined into the cast aluminum crankcase. The bearing caps may be constructed as units including two or more bearing caps made of a single piece. In this way, the bearing caps may be secured or bolted to the upper halves as a unit.

Figure 3:
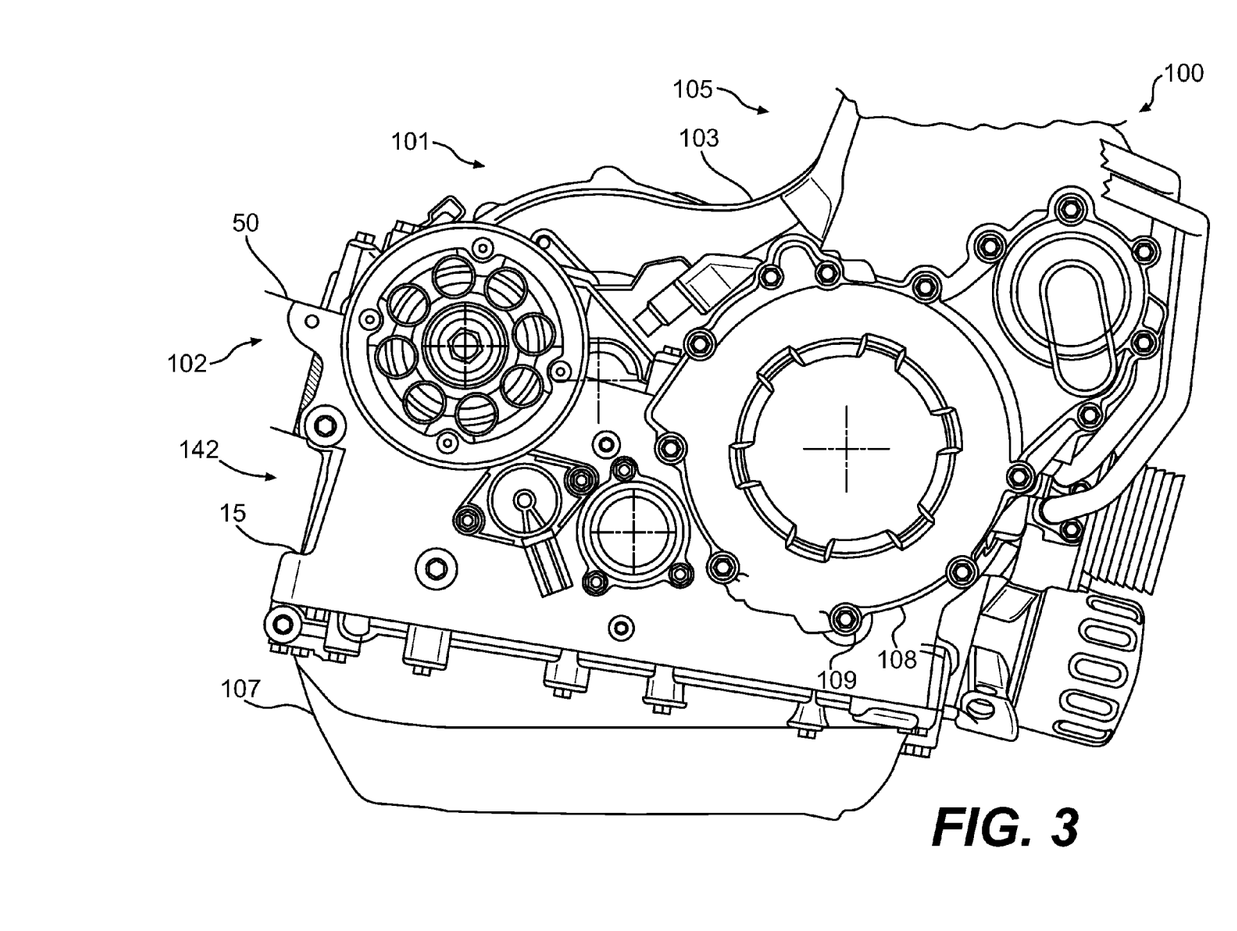
FIG. 3 is a side elevational view of an internal combustion engine incorporating a crankshaft bearing assembly in accordance with one embodiment of the invention.

With reference to FIG. 3, an internal combustion engine 100 has an power unit case 101. The power unit case 101 includes a crankcase 102 that is divided into a cylinder block portion 103, which includes the upper part of the crankcase 102 and a cylinder block 105, and a lower crankcase half 15 along a separating plane 50. An oil sump 107 is secured to the lower crankcase half 15. A cylinder head assembly (not shown) sits atop the cylinder block 105. The cylinder block 105 has two cylinders (not shown) inside each of which a piston reciprocates. Each of the pistons together with the side wall of its corresponding cylinder and the corresponding portion of the cylinder head assembly forms a combustion chamber (not shown). Since the internal combustion engine 100 of the present invention is preferably a four-cycle engine, at least one intake valve per cylinder (not shown) and at leas one exhaust valve per cylinder (not shown) are provided in the cylinder head assembly. Two intake valves and two exhaust valves per cylinder are preferably provided. A single overhead camshaft (not shown) disposed in the cylinder head assembly and operatively connected to the crankshaft 10, controls the actuation of the intake and exhaust valves. It is contemplated that two overhead camshafts (one for the intake valves and one for the exhaust valves) could be used. A fuel injector (not shown) and a spark plug (not shown) per cylinder are also provided in the cylinder head assembly. A pair of throttle bodies (one per cylinder) are used to regulate the quantity of air entering the combustion chambers. An air intake manifold (not shown) or an airbox (not shown) or both, are provided upstream of and in fluid communication with the throttle bodies. An exhaust manifold (not shown) in fluid communication with each combustion chamber is provided on the side of the cylinder block. The exhaust manifold is in fluid communication with the exhaust system of the vehicle incorporating the engine 100. It would be understood that the engine 100 also has other elements and systems not specifically shown and/or described in the present application. These can include, but are not limited to, a starter motor, an oil filter, a cooling system, an electrical system, and a fuel injection system.

The power unit case 101 also includes an integrated transmission housing 142 which can be made in integrally with the crankcase 102 or fastened to the crankcase 102, with bolts for example. The side part of the power unit case 101 has a first housing cover 108 that is secured by at least one fastener 109, such as a screw, to the crankcase 102. When mounted, the first housing cover 108 forms part of the power unit case 101. In the present embodiment, the first housing cover 108 is an ignition cover which can be removed to provide access to an ignition chamber located in the space inside the power unit case 101 within which the ignition system or generator-ignition system is located. The ignition chamber can be part of the crankcase 102 or can be partially separated from the crankcase 102.

Figure 4:
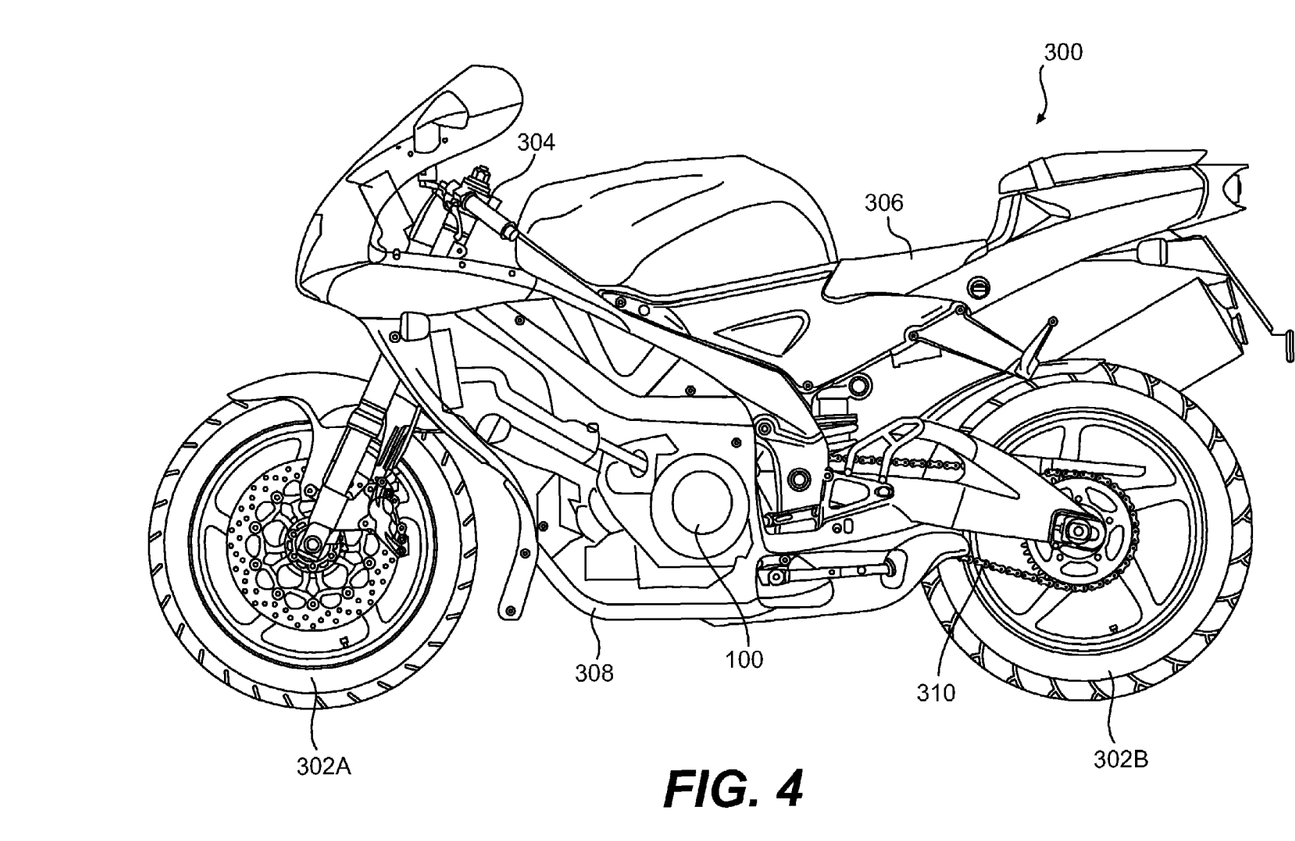
FIG. 4 is a side elevations view of a motorcycle having an internal combustion engine as shown in FIG. 3; and, FIG. 5 a side elevational view of a All-Terrain Vehicle (ATV) having an internal combustion engine as shown in FIG. 3.

The internal combustion engine 100 can be used to power a motorcycle 300, as shown in FIG. 4. The motorcycle 300 has two wheels 302a, 302b, a handlebar 304 to steer the front wheel 302a, and a straddle-type seat 306. The engine 100 is mounted to the frame 308 of the motorcycle 300 below the seat 306. The engine 100 powers the motorcycle 300 by having the output shaft of the transmission operatively connected to the rear wheel 302b via a chain 310. The crankshaft bearing assembly in accordance with the present invention enable the designer of the motorcycle 300 to reduce the weight of the motorcycle thereby improving the ratio weight/power.

Figure 5:
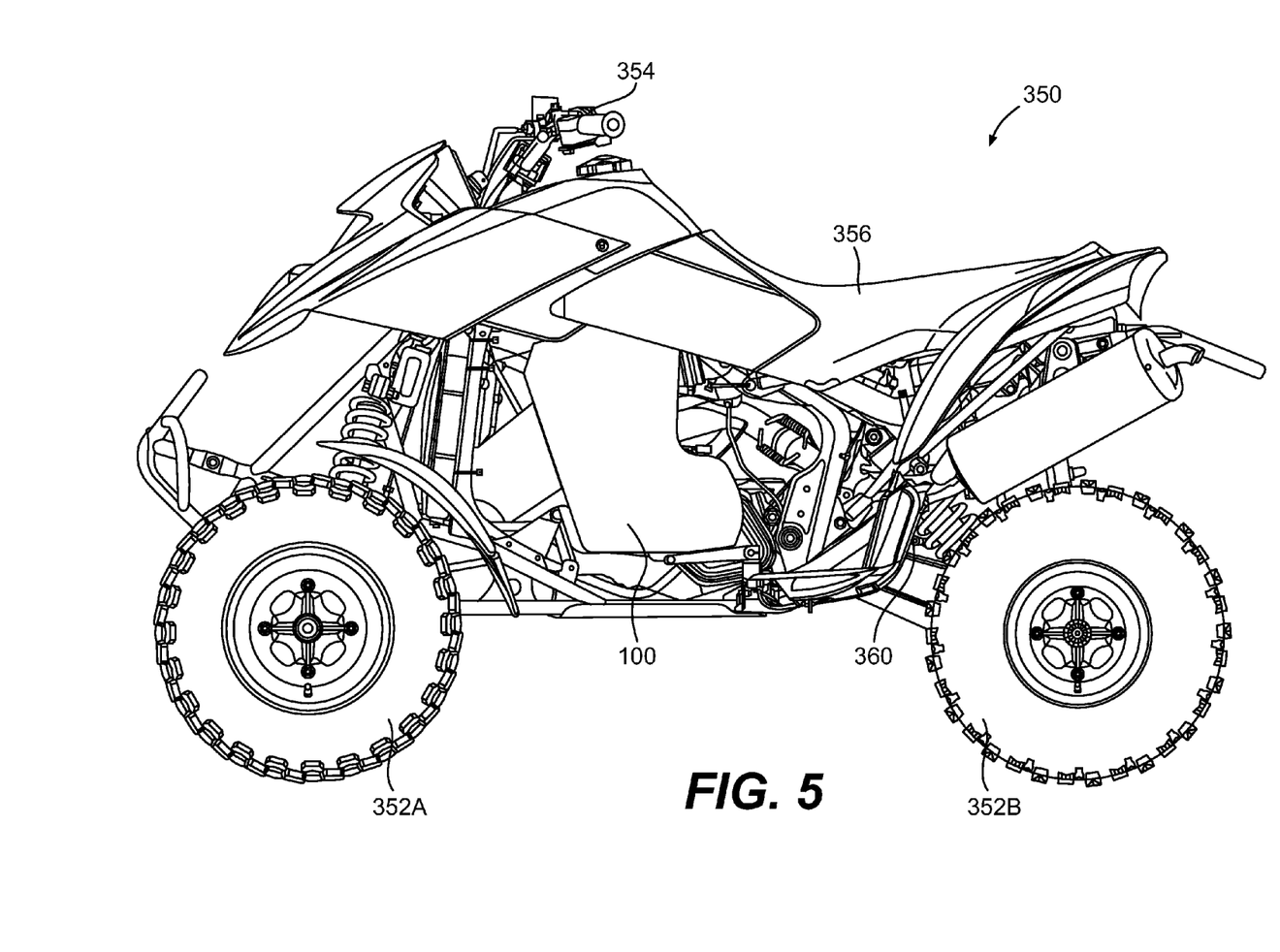

The internal combustion engine 100 can also be used to power an all-terrain vehicle (ATV) 350, as shown in FIG. 5. The ATV 350 has two front wheels 352a, two rear wheels 352b, a handlebar 354 to steer the two front wheels 352a, and a straddle-type seat 356. The engine 100 is mounted to the frame 358 of the ATV 350 below the seat 356. The engine 100 powers the ATV 350 by having the output shaft of the transmission operatively connected to the two rear wheels 352b via a chain 360. The crankshaft bearing assembly in accordance with the present invention enable the designer of the ATV 350 to reduce the weight of the ATV thereby improving the ratio weight/power.

The crankshaft bearing assembly in accordance with the present invention is suitable for use in internal combustion engines including those used to power various motorized recreational vehicles, such as motorcycles, small off-road vehicles (ATV, quads), personal watercrafts (PWC), snowmobiles, sport boats, inboard and outboard engines, aircraft, karts, and small utility vehicles.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A crankshaft bearing assembly for supporting a crankshaft for rotation about a crankshaft axis within an engine having a crankcase, the crankshaft bearing assembly including at least one crankshaft bearing divided into a first half and a second half, the first half and the second half together defining a crankshaft bearing bore, the first half being integral with the crankcase, and the second half being a bearing cap connectable to the crankcase;

the crankcase being made of a first aluminum alloy having a first tensile strength and the bearing cap being made of a second aluminum alloy having a second tensile strength higher than the first tensile strength, the second tensile strength of the second aluminum alloy being at least 300 MPa.

2. A crankshaft bearing assembly as defined in claim 1, wherein the first aluminum alloy is a cast alloy and the second aluminum alloy is a wrought alloy.

3. A crankshaft bearing assembly as defined in claim 1, wherein the first half of the bearing is made by casting and the second half of the bearing is made by forging.

4. A crankshaft bearing assembly as defined in claim 1, wherein the second tensile strength is at least 350 MPa.

5. A crankshaft bearing assembly as defined in claim 1, wherein the first tensile strength is at most 250 MPa.

6. A crankshaft bearing assembly as defined in claim 1, wherein the bearing cap is connected to the crankcase by at least two bolted connections.

7. A crankshaft bearing assembly as defined in claim 1, wherein the least one crankshaft bearing is a crankshaft main bearing.

8. A crankshaft bearing assembly as defined in claim 1, wherein the bearing bore is split by the division of the crankshaft bearing.

9. A crankshaft bearing assembly as defined in claim 8, wherein bearing bushings are disposed within the bearing bore.

10. A crankshaft bearing assembly as defined in claim 1, wherein the at least one crankshaft bearing includes a first crankshaft bearing having a first bearing cap and a second crankshaft bearing having a second bearing cap, each of the first and the second bearing caps being made in one piece.

11. A crankshaft bearing assembly as defined in claim 1, wherein:
the crankcase has a crankcase upper half and a crankcase lower half; and
the crankshaft bearing assembly further comprises a pair of end bearings, the at least one crankshaft bearing being disposed between the pair of end bearings, each end bearing having an end bearing cap integral with the crankcase lower half.

12. An internal combustion engine comprising a crankshaft bearing assembly as defined in claim 1, the internal combustion engine having at least two cylinders and a power unit case having a crankcase and an integral transmission housing accommodating at least a transmission shaft.

13. A crankshaft bearing assembly for supporting a crankshaft for rotation about a crankshaft axis within an engine having a crankcase, the crankshaft bearing assembly including at least one crankshaft bearing divided into a first half and a second half, the first half being integral with the crankcase, and the second half being a bearing cap connectable to the crankcase;
the crankcase being made of a first aluminum alloy having a first tensile strength and the bearing cap being made of a second aluminum alloy having a second tensile strength higher than the first tensile strength, the second tensile strength of the second aluminum alloy being at least 300 Mpa;
wherein the crankcase includes lateral extensions disposed on each side of the bearing cap, the bearing cap being bolted to the lateral extensions of the crankcase.

14. A motorcycle having an internal combustion engine, the internal combustion engine having at least two cylinders, a crankshaft and a crankshaft bearing assembly for supporting the crankshaft within a power unit case having a crankcase and an integral transmission housing accommodating at least a transmission shaft; the crankshaft bearing assembly including at least one crankshaft bearing divided into a first half and a second half, the first half and the second half together defining a crankshaft bearing bore, the first half being integral with the crankcase, and the second half being a bearing cap connectable to the crankcase;
the crankcase being made of a first aluminum alloy having a first tensile strength and the bearing cap being made of a second aluminum alloy having a second tensile strength higher than the first tensile strength, the second tensile strength of the second aluminum alloy being at least 300 MPa.

15. An All-Terrain Vehicle (ATV) having an internal combustion engine, the internal combustion engine having at least two cylinders, a crankshaft and a crankshaft bearing assembly for supporting the crankshaft within a power unit case having a crankcase and an integral transmission housing accommodating at least a transmission shaft; the crankshaft bearing assembly including at least one crankshaft bearing divided into a first half and a second half, the first half and the second half together defining a crankshaft bearing bore, the first half being integral with the crankcase, and the second half being a bearing cap connectable to the crankcase;
the crankcase being made of a first aluminum alloy having a first tensile strength and the bearing cap being made of a second aluminum alloy having a second tensile strength higher than the first tensile strength, the second tensile strength of the second aluminum alloy being at least 300 MPa.

* * * * *

UNITED STATES PATENT AND TRADEMARK OFFICE
CERTIFICATE OF CORRECTION

PATENT NO. : 7,464,685 B2  
APPLICATION NO. : 11/559712  
DATED : December 16, 2008  
INVENTOR(S) : Markus Hochmayr and Karl Glinsner Page 1 of 1

It is certified that error appears in the above-identified patent and that said Letters Patent is hereby corrected as shown below:

Title Page, Item (30) For. App. Priority Data: should be deleted

Foreign Application Priority Data  
Nov. 14, 2005 (EP)………………..05110703 -- should not appear--

Signed and Sealed this

Seventeenth Day of February, 2009

JOHN DOLL  
*Acting Director of the United States Patent and Trademark Office*